United States Patent [19]

Gilbert et al.

[11] 3,897,281

[45] July 29, 1975

[54] METHOD FOR EPITAXIALLY GROWING A SEMICONDUCTOR MATERIAL ON A SUBSTRATE FROM THE LIQUID PHASE

[75] Inventors: Stephen Lee Gilbert, Newtown, Pa.; Michael Ettenberg, Freehold, N.J.

[73] Assignee: RCA Corporation, New York, N.Y.

[22] Filed: Feb. 9, 1972

[21] Appl. No.: 224,758

[52] U.S. Cl. ................ 148/171; 148/172; 148/173; 118/415; 427/74; 427/87; 252/62.3 GA

[51] Int. Cl.$^{2}$ ............................................ H01L 7/38

[58] Field of Search ............................ 148/171–173; 118/415; 117/201; 252/62.3 GA

[56] References Cited

UNITED STATES PATENTS

| | | | |
|---|---|---|---|
| 3,631,836 | 1/1972 | Jarvela et al. | 148/171 X |
| 3,677,836 | 7/1972 | Lorenz | 148/171 |
| 3,696,262 | 10/1972 | Antypas | 148/171 X |
| 3,741,825 | 6/1973 | Lockwood et al. | 148/171 |
| 3,753,801 | 8/1973 | Lockwood et al. | 148/171 |

OTHER PUBLICATIONS

Blum et al., Proceedings of the IEEE, Vol. 59, No. 10, Oct. 1971, pp. 1498–1502.

*Primary Examiner*—G. Ozaki
*Attorney, Agent, or Firm*—G. H. Bruestle; D. S. Cohen

[57] ABSTRACT

A metal solvent is melted and a semiconductor material is added to the molten metal solvent when the metal solvent is at approximately the temperature at which the deposition is to start. When the semiconductor material is in the metal solvent long enough to allow enough of the semiconductor material to dissolve in the metal solvent to exactly saturate the metal solvent with the semiconductor material the substrate is brought into the solution. Other materials, such as conductivity modifiers and composition modifiers, may be added to each of the solutions either with the semiconductor material or during the deposition process.

Apparatus comprises a boat having a plurality of spaced wells in its upper surface. A first slide for bringing a substrate into contact with molten material in the boat forms the floor of the boat wells. A second slide for adding materials (e.g. semiconductors and dopants) to molten material is spaced from the floor adjacent to but slightly below the top surface of the boat.

8 Claims, 3 Drawing Figures

METHOD FOR EPITAXIALLY GROWING A SEMICONDUCTOR MATERIAL ON A SUBSTRATE FROM THE LIQUID PHASE

BACKGROUND OF THE INVENTION

The present invention relates to a method and apparatus for epitaxially growing one or more layers of a semiconductor material on a substrate by liquid phase epitaxy. More particularly, the present invention relates to such a method and apparatus in which the semiconductor material is added to the molten metal solvent to form the deposition solution just prior to bringing the substrate into contact with the deposition solution and other materials can be added either with the semiconductor material or during the deposition process.

A technique which has come into use for making certain types of semiconductor devices, particularly semiconductor devices made of the group III-V semiconductor materials and their alloys, such as light emitting devices and transferred electron devices is known as "liquid phase epitaxy." Liquid phase epitaxy is a method for depositing an epitaxial layer of a single crystalline semiconductor material on a substrate wherein a surface of the substrate is brought into contact with a solution of a semiconductive material dissolved in a molten metal solvent, the solution is cooled so that a portion of the semiconductor material in the solution precipitates and deposits on the substrate as an epitaxial layer, and the remainder of the solution is removed from the substrate. The solution may also contain a conductivity modifier which deposits with the semiconductor material to provide an epitaxial layer of a desired conductivity type. Two or more epitaxial layers can be deposited one on top of the other to form a semiconductor device of a desired construction including a semiconductor device having a PN junction between adjacent epitaxial layers of opposite conductivity type.

U.S. Pat. No. 3,565,702 to H. Nelson issued Feb. 23, 1971 entitled "Depositing Successive Epitaxial Semiconductive Layers From The Liquid Phase" describes a method and apparatus for depositing one or more epitaxial layers by liquid phase epitaxy and is particularly useful for depositing a plurality of epitaxial layers in succession. The apparatus includes a furnace boat of a refractory material having a plurality of spaced wells in its top surface and a slide of a refractory material movable in a passage which extends across the bottoms of the wells. In the use of this apparatus, a solution is provided in a well and a substrate is placed in a recess in the slide. The slide is then moved to bring the substrate into the bottom of the well so that the surface of the substrate is brought into contact with the solution. When the epitaxial layer is deposited on the substrate, the slide is moved to carry the substrate out of the well. To deposit a plurality of epitaxial layers on the substrate, separate solutions are provided in separate wells and the substrate is carried by the slide to each of the wells in succession to deposit the epitaxial layers on the substrate.

In the use of liquid phase epitaxy, it is desirable that the deposition solution be exactly saturated with the semiconductor material at the temperature that the deposition takes place. If the solution is oversaturated with the semiconductor material, the solution will contain solid particles of the semiconductor material which often results in poor crystalline quality of the deposited epitaxial layer. If the solution is unsaturated with the semiconductor material the substrate when introduced into solution will dissolve in the solution in an uncontrollable way. This will result in poor planarity of the deposited layer. To achieve exact saturation of the solution at the deposition temperature by controlling the proportions of the ingredients originally used to form the solution is difficult since slight variations in the temperature will change the solubility of the solution. This becomes even more difficult when depositing a plurality of epitaxial layers in succession from a plurality of solutions as described in Patent No. 3,565,702 since each layer is deposited at a different temperature.

SUMMARY OF THE INVENTION

An epitaxial layer of single crystalline semiconductor material is deposited on a substrate by heating a charge which contains or consists of a solvent for the semiconductor material. The charge is heated to a temperature at which the solvent is molten and the semiconductor material will dissolve in the solvent. The semiconductor material is then placed in the molten solvent, such as by dropping it in, with enough semiconductor being used to saturate the solvent with the semiconductor material. A surface of the substrate is brought into contact with the saturated molten solvent and the solvent is then cooled to deposit an epitaxial layer of the semiconductor material on the substrate.

The epitaxial layer can be deposited on the substrate by an apparatus which includes a boat having a well in its top surface. First means are included for carrying a substrate into the well adjacent the bottom of the well. Second means are included for supporting a material adjacent the top of the well. The second means are movable to allow the material supported thereon to be deposited into the well.

DETAILED DESCRIPTION

Figure 1:
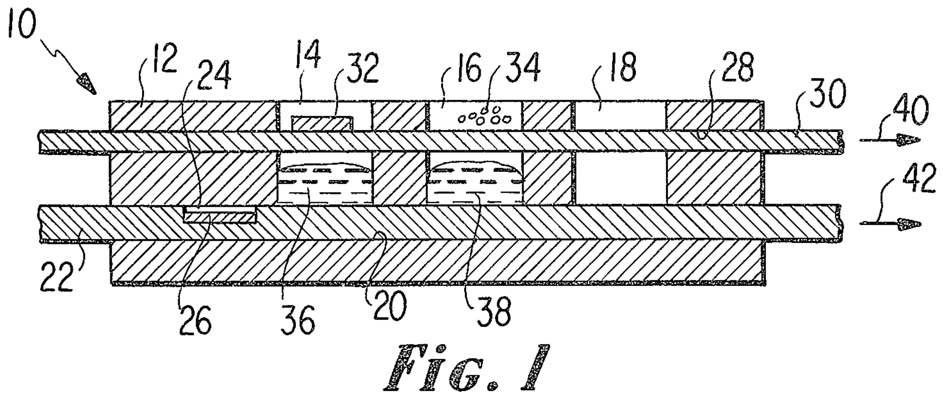
FIG. 1 is a longitudinal cross-sectional view of a form of the apparatus of the present invention.
Figure 2:
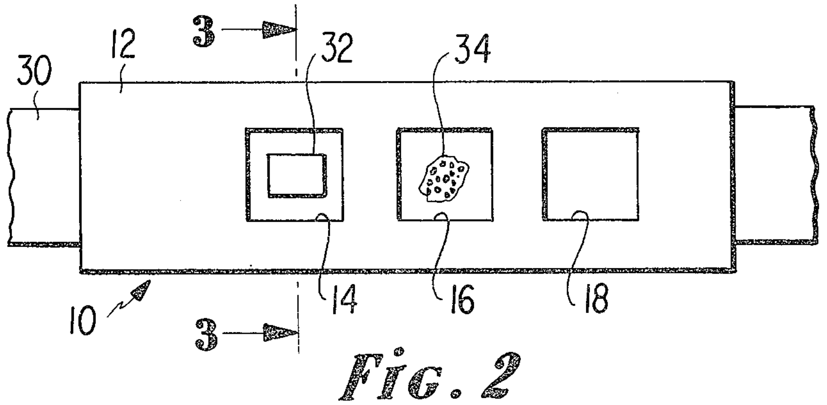
FIG. 2 is a top plan view of the apparatus of FIG. 1.
Figure 3:
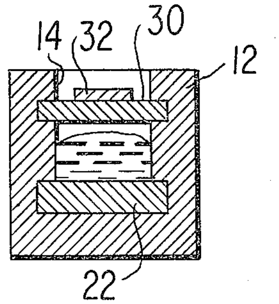
FIG. 3 is a sectional view taken along line 3—3 of FIG. 2.

Referring to the drawing, a form of the apparatus of the present invention is generally designated as 10. The apparatus 10 comprises a refractory furnace boat 12 of an inert, refractory material, such as graphite. The boat 12 has three, spaced wells 14, 16 and 18 in its upper surface. A first passage 20 extends longitudinally through the boat 12 from one end to the other end and extends across the bottoms of the wells 14, 16 and 18. A first slide 22 of a refractory material, such as graphite, movably extends through the first passage 20 so that the top surface of the first slide forms the bottom surfaces of the wells 14, 16 and 18. The first slide 22 has a substrate receiving recess 24 in its upper surface. The recess 24 is large enough to receive a flat substrate 26 therein with the substrate lying flat in the recess. Preferably, the recess 24 is slightly deeper than the thickness of the substrate 26 so that the upper surface of the substrate is below the top of the recess. A second passage 28 extends longitudinally through the furnace boat 12 from one end of the boat to the other end. The second passage 28 is spaced from the first slide and positioned slightly below the upper surface of the boat 12 and extends across the wells 14, 16 and 18. A second slide 30 of a refractory material, such as graphite, movably extends through the passage 28 and crosses each of the wells 14, 16 and 18.

To carry out the method of the present invention with the apparatus 10, the second slide is removed from the boat 12 and separate main charges are placed in the wells 14 and 16. Each of the main charges is a metal solvent for the semiconductor material to be deposited. For example, to deposit epitaxial layers of gallium arsenide, the semiconductor material would be gallium arsenide and the metal solvent would be gallium. If the epitaxial layer to be deposited is to be of a particular conductivity type, the main charge may also include a desired conductivity modifier. However, as will be explained later, for certain conductivity modifiers, it may be desirable to add the conductivity modifier later during the deposition process.

The second slide 30 is then placed back in the second passage 28 so that the second slide extends across the wells 14, 16 and 18. Additional charges containing the semiconductor material to be deposited are placed on the upper surface of the second slide 30 in each of the wells 14 and 16. The additional charge may be a solid body of the semiconductor material, such as the body 32 shown in the well 14 in FIG. 1, or may be in granulated solid form, as shown by the additional charge 34 in the well 16. If the conductivity modifier is to be added to the main charge during the deposition process, the conductivity modifier is also placed on the upper surface of the second slide 30 in the respective well. The substrate 26 of a material suitable for epitaxial deposition is placed in the recess 24 in the first slide 22.

The loaded furnace boat 12 is then placed in a furnace tube (not shown) and a flow of high purity hydrogen is provided through the furnace tube and over the furnace boat 12. The heating means for the furnace tube is turned on to heat the contents of the furnace boat 12 to a temperature at which the metal solvent is molten, as indicated by the molten charges 36 and 38 in FIG. 1, and at which a desired amount of the semiconductor material will dissolve in the molten solvent, for example between 800°C to 950°C for GaAlAs or GaAs. If either of the main charges also contains a conductivity modifier, the conductivity modifier will dissolve in the molten charges 36 and 38. However, certain conductivity modifiers contain oxides of the modifier which would contaminate the molten charges. By placing such conductivity modifiers on the second slide 30 the heating of the conductivity modifier in the hydrogen atmosphere reduces the oxides so as to remove the contaminants. Thus, when using a conductivity modifier which contains an oxide or any other contaminant which can be removed by heating in a hydrogen atmosphere, it is preferable to place the conductivity modifier on the second slide 30 rather than initially include the conductivity modifier in the main charges.

The second slide 30 is then moved in the direction of the arrow 40 in FIG. 1 until the second slide is completely out of the well 14. This allows the semiconductor material body 32 as well as any conductivity modifier which may be on the second slide in the well 14 to drop into the molten metal solvent 36. The semiconductor material of the body 32 will dissolve in the molten metal solvent 36 until the metal solvent is exactly saturated with the semiconductor material at the then temperature of the metal solvent. Any of the body 32 which does not dissolve in the metal solvent will float on the solvent and will not adversely affect the deposition to take place. Any conductivity modifier dropped into the metal solvent 36 also dissolves in the metal solvent. Thus there is provided a deposition solution of the semiconductor material and the conductivity modifier in the molten metal solvent which deposition solution is exactly saturated with the semiconductor material at the then temperature of the solution.

The first slide 22 is then moved in the direction of the arrow 42 in FIG. 1 until the substrate 26 is within the well 14. This brings the surface of the substrate into contact with the exactly saturated deposition solution in the well 14. The temperature of the furnace tube is then lowered to cool the furnace boat 12 and its contents to a first preselected temperature. Cooling of the exactly saturated solution in the well 14 causes some of the semiconductor material in the solution to precipitate out of the solution and deposit on the surface of the substrate to form a first epitaxial layer. Some of the conductivity modifiers in the solution become incorporated in the lattice of the first epitaxial layer to provide the first epitaxial layer with a desired conductivity type. The amount of cooling of the solution determines the amount of semiconductor material precipitated therefrom and thereby the thickness of the first epitaxial layer deposited on the substrate 26.

The second slide 30 is then again moved in the direction of the arrow 40 until the second slide is completely out of the well 16. This allows the semiconductor material 34 as well as any conductivity modifiers which may be on the second slide within the well 16 to drop into the molten solvent 38. The semiconductor material will dissolve in the molten solvent 38 until the solvent is exactly saturated with the semiconductor material at the then temperature of the molten solvent. Also, any conductivity modifier which is dropped into the molten solvent 38 will dissolve in the molten solvent 38; thus, there is provided a deposition solution of the semiconductor material and the conductivity modifier in the molten metal solvent which deposition solution is exactly saturated with the semiconductor material at the then temperature of the solution.

The first slide 22 is then again moved in the direction of the arrow 42 to move the substrate 26 with the first epitaxial layer thereon from the well 14 into the well 16. This brings the surface of the first epitaxial layer into contact with the saturated deposition solution in the well 16 at the then temperature of the solution. The temperature of the furnace tube is lowered further to cool the furnace boat 12 and its contents to a second preselected temperature which is lower than the first preselected temperature. Cooling the solution causes some of the semiconductor material in the solution to precipitate out and deposit on the surface of the first epitaxial layer to form a second epitaxial layer. Some of the conductivity modifiers in the solution becomes incorporated in the lattice of the second epitaxial layer to provide the second epitaxial layer with a desired conductivity type. The first slide 22 is then again moved in the direction of the arrow 42 to carry the substrate 26 with the two epitaxial layers thereon out of the well 16 into the empty well 18 where the substrate can be removed from the slide.

The present method wherein all or at least the major portion of the semiconductor material is added to the molten metal solvent prior to bringing the substrate into contact with the deposition solution has advantages over prior techniques wherein all or the major portion of the semiconductor material is mixed with the metal solvent charge prior to heating the charges to the molten state. One advantage is that it provides deposition solutions which are exactly saturated with the semiconductor material at the temperature at which the deposition of the epitaxial layer is to take place so that the epitaxial layer deposited from the deposition solution is of good crystalline quality and good planarity. Another advantage is that when the deposition solution in the well 14 is cooled to deposit the first epitaxial layer, the molten metal solvent in the well 16, which is cooled at the same time, contains little, if any, semiconductor material. If the molten metal solvent in the well 16 contained a major amount of the semiconductor material, the cooling of the solution in the well 16 during the deposition of the first epitaxial layer would cause some of the semiconductor material in the solution in the well 16 to precipitate out and either deposit on the first slide 22 or form platelets of semiconductor material in the solution. Such precipitated semiconductor material would adversely affect the physical characteristics of the second epitaxial layer which is later deposited from the solution in the well 16. However, since in the method of the present invention the metal solvent in the second well 16 contains little, if any, semiconductor material during the deposition of the first epitaxial layer, the formation of undesirable precipitates of the semiconductor material in the second well 16 is eliminated.

Although the method of the present invention has been described with regard to depositing two successive epitaxial layers, it can be used to deposit either a single epitaxial layer or more than two epitaxial layers. To deposit a single epitaxial layer, only one solution is formed in one of the wells of the furnace boat 12. To deposit more than two epitaxial layers on the substrate, the furnace boat 12 is provided with a separate well for forming a solution for each epitaxial layer to be deposited. Also, although the method has been described with regard to the adding of the semiconductor material and a conductivity modifier to the metal solvent to form the deposition solutions, it can be used to add other materials to the deposition solutions during the deposition process.

In addition, the furnace boat 12 may be provided with additional slides extending through the boat above or below the second slide 30 to permit various additional materials to be added to a solution at different times during the fabrication process. For example, if it is desirable to change the concentration of a conductivity modifier or to change the type of the conductivity modifier in an epitaxial layer as it is being deposited, the additional conductivity modifier can be placed on an additional slide. Thus, after the material on the second slide 30 is dropped into the molten metal solvent and as the resulting solution is cooled to deposit the epitaxial layer, the additional slide can be moved to drop the additional conductivity modifier into the solution and thereby change the concentration or type of conductivity modifier in the succeeding portion of the deposited epitaxial layer. Similarly, the composition of the semiconductor material of the deposited epitaxial layer can be changed during the deposition of the epitaxial layer. For example, if the epitaxial layer to be initially deposited from a solution is gallium arsenide or a group III-V compound alloy, such as gallium aluminum arsenide, and it is desired to change the initial gallium arsenide layer to gallium aluminum arsenide or change the concentration of the aluminum in the initial gallium aluminum arsenide layer, aluminum can be placed on the additional slide and dropped into the initially formed solution as the deposition is taking place.

Instead of placing the semiconductor material on the second slide and the conductivity or composition modifiers on the additional slide, the conductivity or composition modifiers can be placed on the second slide and the semiconductor material on the additional slide. This permits the conductivity or composition modifiers to be dropped into the molten metal solvents in the various wells either in succession or all simultaneously prior to dropping the semiconductor material into the respective molten metal solvents.

Thus, there is provided by the present invention a method and apparatus for epitaxially depositing one or more layers of a semiconductor material on a substrate in which the semiconductor material is added to the molten metal solvent while the solvent is in a controlled atmosphere and/or at a controlled temperature and prior to bringing the substrate into contact with the deposition solution so as to provide a deposition solution which is exactly saturated with the semiconductor material at the temperature at which the deposition is to take place. Also, the method and apparatus of the present invention allows for the addition of various materials to the deposition solution during the fabrication process so as to permit the composition of the deposited epitaxial layer to be controlled or varied.

We claim:

1. A method of depositing on a substrate an epitaxial layer of single crystalline semiconductor material comprising the steps of:

providing in a boat the substrate, the semiconductor material, and a charge of a solvent for the semiconductor material which charge is separated from and below the semiconductor material, placing the boat in means for providing a controlled atmosphere and/or at a controlled temperature, heating the solvent to a temperature at which the solvent is molten and the semiconductor material will dissolve in the solvent, dropping into the molten solvent, without removing the boat from the controlled atmosphere and/or temperature means, the semiconductor material in an amount sufficient to saturate the solvent with the semiconductor material, then bringing a surface of the substrate into contact with the saturated molten solvent, and then cooling the saturated molten solvent sufficiently to deposit an epitaxial layer of the semiconductor material on the substrate.

2. The method in accordance with claim 1 including adding to the solvent a material for modifying the characteristics of the epitaxial layer to be deposited.

3. The method in accordance with claim 2 in which the modifying material is dropped into the molten solvent along with the semiconductor material.

4. The method in accordance with claim 2 in which the modifying material is dropped into the saturated solvent while it is being cooled.

5. The method in accordance with claim 1 in which a plurality of epitaxial layers of a semiconductor material are deposited in succession by heating a plurality of separate charges of a solvent for the semiconductor material to the temperature at which the solvent is molten and the semiconductor material will dissolve in the molten solvent, separately dropping a semiconductor material in each of the molten charges in succession to saturate each of the molten charges with the semiconductor material, bringing the substrate into each of the saturated molten charges in succession just after the semiconductor material is dropped in the respective molten charge, and while the substrate is in each of the saturated molten charges cooling the charge to deposit an epitaxial layer of the semiconductor material from the saturated molten charge on the substrate.

6. The method in accordance with claim 5 including adding to at least one of the charges a material for modifying the characteristics of the epitaxial layer to be deposited from said charge.

7. The method in accordance with claim 6 in which the modifying material is dropped into the molten charge along with the semiconductor material.

8. The method in accordance with claim 6 in which the modifying material is dropped into the saturated molten charge while it is being cooled.

* * * * *